(12) United States Patent
Walther

(10) Patent No.: US 6,957,848 B2
(45) Date of Patent: Oct. 25, 2005

(54) ENGINEERED WELDED BLANK

(75) Inventor: James W. Walther, Chatham, OH (US)

(73) Assignee: Shiloh Industries, Inc., Cleveland, OH (US)

(*) Notice: Subject to any disclaimer, the term of this patent is extended or adjusted under 35 U.S.C. 154(b) by 0 days.

(21) Appl. No.: 10/761,710

(22) Filed: Jan. 21, 2004

(65) Prior Publication Data

US 2004/0251711 A1     Dec. 16, 2004

Related U.S. Application Data

(60) Provisional application No. 60/478,297, filed on Jun. 13, 2003.

(51) Int. Cl.[7] .................. B62D 25/00; B60J 5/00
(52) U.S. Cl. .................... 296/191; 296/146.5
(58) Field of Search ............ 296/146.5, 191; 52/783.11

(56) References Cited

U.S. PATENT DOCUMENTS

| | | |
|---|---|---|
| 5,328,083 A | 7/1994 | Peru et al. |
| 5,614,112 A | 3/1997 | Peru et al. |
| 6,060,682 A * | 5/2000 | Westbroek et al. .... 219/121.64 |
| 6,261,701 B1 * | 7/2001 | Fields, Jr. .................. 428/577 |
| 6,513,860 B1 * | 2/2003 | Ourchane et al. ......... 296/146.5 |
| 6,739,647 B2 * | 5/2004 | Obara et al. ................ 296/191 |

* cited by examiner

Primary Examiner—Dennis H. Pedder
(74) Attorney, Agent, or Firm—Reising, Ethington, Barnes, Kisselle, P.C.

(57) ABSTRACT

A laser welded blank for use in applications calling for an engineered or tailor welded blank, such as in vehicle door panel assemblies. Two sheet metal pieces of different thicknesses are in edge-to-edge abutment such that an interface is formed therebetween, however, the mating edges are not parallel. Instead, a first segment of the interface is flush on a first side of the laser welded blank, while a second segment is flush on a second side of the blank. This arrangement permits an adjacent component, such as a rubber seal, located on one side of the laser welded blank to extend across or contact the interface at the first segment, while another component located on the other side of the blank may extend across or contact the interface at the second segment. Because both components are in flush contact with the interface, there is a reduction of air gaps, leaks, etc.

19 Claims, 3 Drawing Sheets

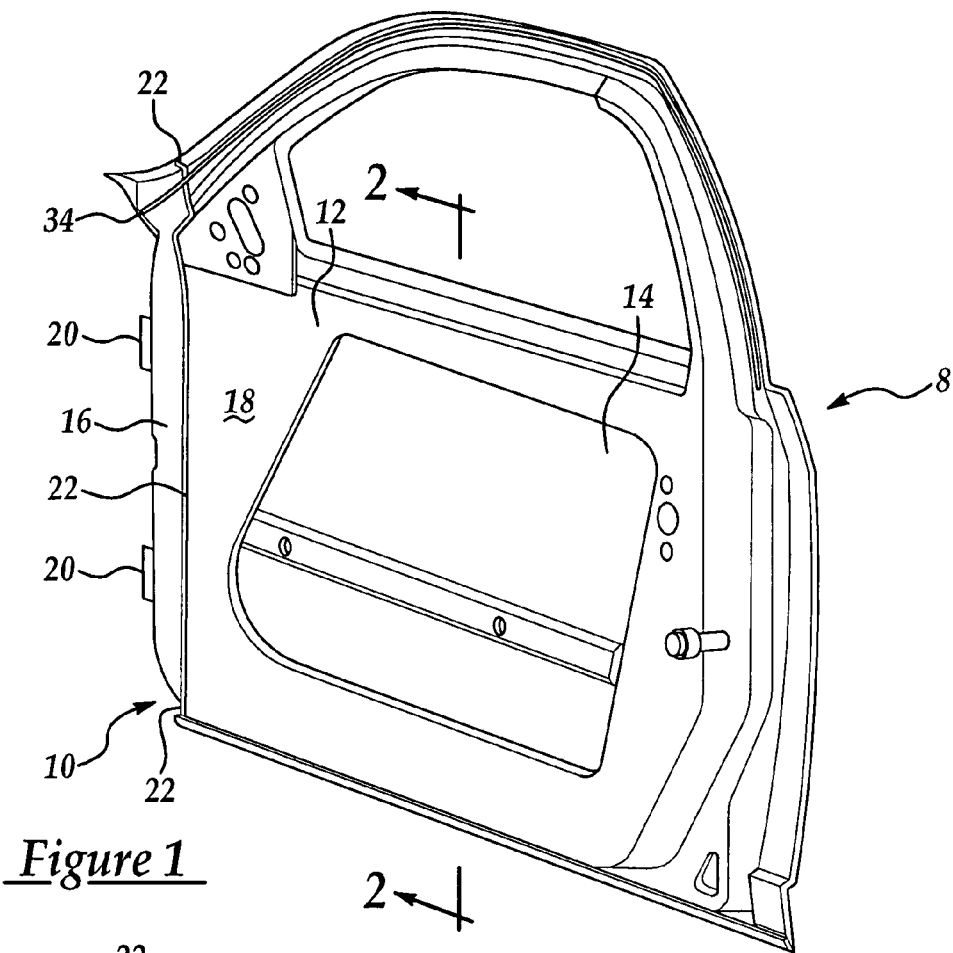
*Figure 1*
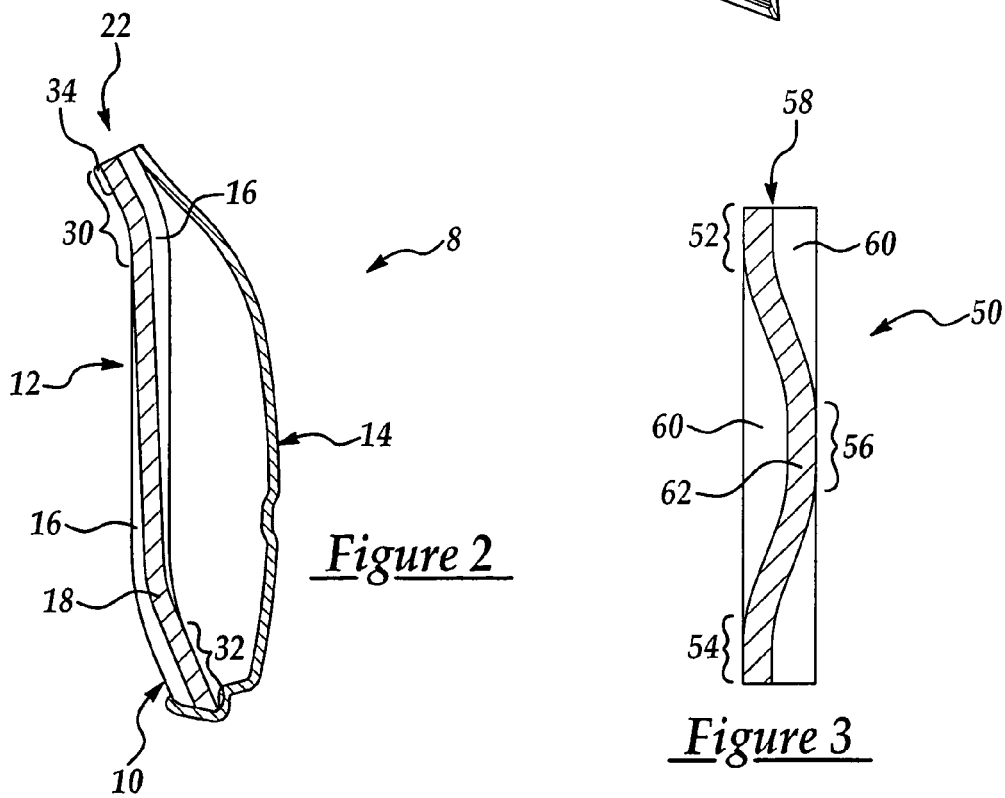
*Figure 2*
*Figure 3*

ENGINEERED WELDED BLANK

This application claims the benefit of U.S. Provisional Application No. 60/478,297 filed Jun. 13, 2003, the entire contents of which are hereby incorporated by reference.

TECHNICAL FIELD

The present invention relates generally to engineered or tailor welded blanks, and more particularly, to an interface formed between two sheet metal pieces.

BACKGROUND OF THE INVENTION

There are many applications, particularly in the automotive industry, which call for the use of engineered welded blanks (EWB), also referred to as tailor welded blanks (TWB). These types of blanks can reduce the cost, weight and complexity of certain parts without sacrificing structural integrity. For instance, a common application is in automotive door panels, where the EWB or TWB is generally comprised of a thin piece of sheet metal butt welded to a thicker piece of sheet metal to form a unitary blank. For the majority of the door panel area, the thinner sheet metal will suffice; however, for areas such as mounting points for the door hinges, thicker, stronger sheet metal is required. Thus, the EWB or TWB exhibits increased strength along those areas where it is needed without having to construct the entire door panel out of the heavier, more costly, thicker sheet metal.

Laser welding, which can be used as an alternative to more conventional techniques such as mash seam welding, is a well known EWB or TWB welding technique that is capable of producing a high quality, precision welded blank. Thus, a laser welded blank can be a type of engineered welded blank. According to one laser welding method, two blanks, one being thicker than the other, are brought into contact with one another such that their straight edges are in abutment. Once they are abutted, upper and lower clamping components are brought into contact with the sheet metal pieces such that they firmly retain them in place. A high powered laser beam is then directed along the interface of the abutted edges, usually at a slight angle, such that a uniform linear weld is created. Some applications, referred to as static installations, maintain the pieces of sheet metal in a stationary position while the laser welding unit moves along the interface. Conversely, other applications keep the laser welding unit stationary while indexing the two pieces of sheet metal. Techniques such as these are already known in the art, and are taught in references such as U.S. Pat. No. 5,614,112 issued Mar. 25, 1997 to Peru et al. and U.S. Pat. No. 5,328,083 issued Jul. 12, 1994 also to Peru et al.

The prior art products and techniques discussed above are sufficient for certain applications; however, there is still much room for improvement. It is a general object of the present invention to provide an engineered welded blank and a method for producing the same that includes an improved weld seam.

SUMMARY OF THE INVENTION

In accordance with one aspect of the present invention there is provided an engineered welded blank generally comprised of a first sheet metal piece, a second sheet metal piece and a weld seam. The first and second sheet metal pieces abut one another along an edge-to-edge interface where one of the edges is thicker than the other, and the weld seam extends along at least a portion of that interface. Inner sides of the first and second sheet metal pieces are flushly aligned along a first segment of the interface and outer sides of the first and second sheet metal pieces are flushly aligned along a second segment of the interface.

According to another aspect of the present invention, the first and second sheet metal pieces have edges of unequal thicknesses that abut one another along an edge-to-edge interface. The weld seam extends along at least a portion of the interface, such that at least one segment of the interface includes an outboard projection and at least one segment of the interface includes an inboard projection.

According to another aspect of the present invention, there is provided a door panel assembly for use on a vehicle that includes an inner door panel, an outer door panel and a seal. The inner door panel includes a thick sheet metal piece, a thin sheet metal piece and a laser welded seam along an interface of the two sheet metal pieces, similar to that described above. The seal, on the other hand, extends along at least a portion of the periphery of the door panel assembly. The interface includes a first segment where the inner sides of the sheet metal pieces are level such that the seal may flushly extend across the first segment, and a second segment where the outer sides of the sheet metal pieces are level such that the outer door panel may flushly contact the second segment.

According to another aspect of the present invention, there is provided a method of manufacturing an engineered welded blank, similar to the embodiments described above.

Objects, features and advantages of this invention include providing an engineered welded blank with an improved interface between thick and thin sheet metal pieces, such that the interface includes flush segments on both sides of the engineered welded blank for an improved fit with adjacent components, provides a blank of improved strength and structural integrity, may be manufactured according to an improved method of manufacture, and is of relatively simple design, economical manufacture and assembly and has a long and useful life in service.

BRIEF DESCRIPTION OF THE DRAWINGS

These and other objects, features and advantages of this invention will be apparent from the following detailed description of the preferred embodiments and best mode, the appended claims and the accompanying drawings, in which:

FIG. 1 is a perspective view of a vehicle door panel assembly utilizing an embodiment of the engineered welded blank of the present invention;

FIG. 2 is a cross-sectional of the vehicle door panel assembly of FIG. 1 taken along lines 2—2, and shows an edgewise view of the engineered welded blank of FIG. 1;

FIG. 3 is an edgewise view of another embodiment of the engineered welded blank of the present invention;

DETAILED DESCRIPTION OF THE PREFERRED EMBODIMENTS

Figure 4:
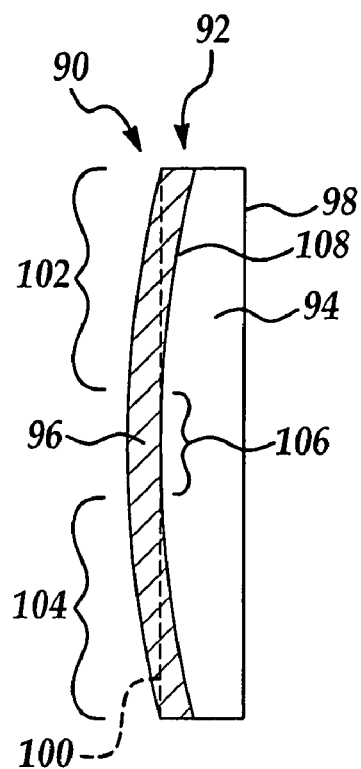
FIG. 4 is an edgewise view of another embodiment of the engineered welded blank of the present invention, including a negative step formed on one side of the engineered welded blank.

With reference to FIGS. 1 and 2, there is shown an example of a vehicle door panel assembly 8 utilizing an engineered welded blank according to one embodiment of the present invention. Although engineered welded blanks do not have to be laser welded, as they could be electron beam welded, mash seam welded, or welded according to some other known technique, engineered welded blank 10 is preferably a laser welded blank. Thus, the engineered welded blank will be hereafter referred to as the laser welded blank. Door panel assembly 8 is generally comprised of an inner door panel 12 and an outer door panel 14, both of which are sheet metal components that are hemmed or otherwise attached to one another through methods known in the art. As previously discussed in the background section, it is desirable for certain components, such as the inner door panel 12, to utilize sheet metal stock of varying thicknesses. The inner door panel 12 preferably includes laser welded blank 10 which is comprised of an elongated piece of thick sheet metal 16 welded to a piece of thin sheet metal 18; an assembly also referred to as an engineered welded blank or tailor welded blank. The thick sheet metal piece 16 extends along the same side of the door panel that receives a set of hinges 20, thereby reinforcing the strength of that section of the door. That increased strength, however, is not necessary throughout the entire inner door panel. In fact, the inner door panel 12 would be much heavier and costlier if the thick gauge stock were used over its entire area. Accordingly, the majority of the inner door panel 12 is comprised of the thin sheet metal 18, and the thick or heavy sheet metal 16 is used only in those areas where it is warranted. The thick and thin sheet metal pieces of the laser welded blank 10 are in edge-to-edge abutment such that their edges, also referred to as mating edges, form an interface 22 between the two pieces. This interface is maintained by a laser welded seam that extends along the entire interface, or at least a portion thereof.

Turning now to FIG. 2, there is shown a general cross-sectional view of the door panel assembly 8. For ease of explanation, this view does not show all of the complexities and detail of a typical vehicle door panel, particularly those pertaining to the hem or seam between the inner and outer door panels; such details are well known in the art of vehicle door panel assemblies. Rather, this view is intended to highlight some of the advantages associated with using the laser welded blank 10 of the present invention. Interface 22 is the edge-to-edge interface between the thick and thin sheet metal pieces, and includes segments 30 and 32. Segment 30 is that portion of the interface where the two sheet metal pieces are flushly aligned on an inner side of the laser welded blank 10 (the side of the blank closest the passenger compartment). Stated differently, segment 30 is a section of the interface where the two sheet metal pieces are flush or level on an inner side of the laser welded blank and where the two sheet metal pieces are stepped or non-flush on an outer side of the laser welded blank. This results from the edge-to-edge abutment of a thick sheet of material with a thin sheet of material. As demonstrated in the drawings, the stepped portion of segment 30 points outwardly towards the outer door panel 14; an arrangement known in the art as an 'outboard step'. Conversely, segment 32, which is located towards the bottom of the door panel, is a section of the interface where the two sheet metal pieces are flushly aligned on the outer side of the laser welded blank 10 and are stepped or non-flush on the inner side of the laser welded blank; a condition referred to in the art as an 'inboard step'. As will be discussed in the following paragraphs, the ability to have both an outboard step and an inboard step along a single interface has numerous advantages over those weld seams that carry either an outboard step or an inboard step, but not both.

One such advantage is the ability of a single interface 22 to be in flush contact with adjacent components located on both sides of the laser welded blank 10. In the past, if a laser welded blank were used, it would typically produce either an outboard step or an inboard step that would uniformly extend the entire length of the interface. Accordingly, the interface could be in flush contact with components on one side of the laser welded blank (the flush or level side), but not on both. A flush juxtaposition oftentimes results in an improved seal, an improved joint, or an improved appearance, to name just a few of the benefits, and is thus desirable. For instance, the inner surfaces of the two sheets are flushly aligned at segment 30 such that a periphery seal 34, which extends in a generally perpendicular direction to the interface, is able to extend across that segment without experiencing a step or other discontinuity that would result in a gap. Because of this flush relationship between the seal and the interface, an improved seal is provided for reducing leaking, wind noise, etc.

Conversely, it is often times advantageous to have an inboard step located towards the bottom of the laser welded blank (segment 32) such that an outer surface of the interface 22 may flushly contact the outer door panel 14. During manufacturing of the door panel assembly 8, the lower edge of the outer door panel 14 is crimped or hemmed around the lower edge of the laser welded blank 10. If segment 32 was an outboard step, such as segment 30, this crimping would produce a ridge or step that could be visible from the exterior of the door. This may be undesirable, and additional manufacturing steps, such as grinding the step down, may be required to obtain the desired aesthetic result. Thus, segment 32 is designed as an inboard step with the outer surfaces of the sheet metal pieces being level or flush such that the outer door panel 14 can be crimped against that portion of the interface without producing a ridge or step in the outer door panel. It is worth observing that use of a laser welded blank 10 in a door panel assembly, such as that just described, is only one example of an application of the laser welded blank of the present invention, as numerous other applications also exist.

FIG. 3 shows another embodiment 50 of the present invention having an interface 58 formed between thick and thin sheet metal pieces, 60, 62, respectively. Interface 58 includes two segments 52, 54 where the two sheet metal pieces are flushly aligned on one side of the laser welded blank, such as an inner side, and a single segment 56 of the interface where the two sheet metal components are flushly aligned on the other side of the blank, such as an outer side. Hence, laser welded blank 50 includes a total of two outboard steps and one inboard step, that is, one more outboard step than the laser welded blank 10 of FIG. 2. According to the embodiment of FIG. 2, the interface 22 extends along a generally linear path between segments 30-32. In contrast, interface 58 shown in FIG. 3 extends along a generally non-linear or curved path between segments 52-56-54, respectively. The degree of curvature can of course vary to meet the specific requirements of the intended application. In both embodiments, the mating edges of the two sheet metal pieces extend in a non-parallel manner, with respect to one another, along that section of the interface which extends between segments 30-32 and 52-56-54, respectively. Of course, the number of outboard and/or inboard steps can vary to accommodate the requirements of the particular application and does not have to equal the number shown in the embodiments taught herein, as these are only examples.

With reference to FIG. 4, there is shown another embodiment 90 of the present invention, however, this embodiment includes what is referred to as a 'negative step'. The laser welded blank 90 includes an interface 92 formed between thick and thin sheet metal pieces 94, 96, respectively. Instead of the thin sheet metal piece being totally confined between inner and outer side surfaces 98, 100 of the thicker sheet metal piece, as with the previous embodiments, interface 92 includes segments 102 and 104 where the thin sheet metal piece is partially located within the thicker sheet metal piece and is partially located beyond the outer side surface 100 of the thicker piece. Accordingly, the average overall thickness of laser welded blank 90 is greater than the thickness of thicker sheet metal piece 94 by itself. Laser welded blank 90 also includes a segment 106 of the interface where thinner sheet metal piece 96 is located completely beyond the outer side surface 100 of the thicker sheet metal piece. At segment 106, an inner side surface 108 of thinner sheet metal piece 96 is flush with outer side surface 100 of thicker sheet metal piece 94. Segments 102, 104 and 106 are all referred to as 'negative steps', as they form stepped or non-flush portions located beyond the sides surfaces 98, 100 of thick sheet metal piece 94. Stated differently, the negative steps are stepped or non-flush portions of the interface that are not located within the thickness of thick sheet metal piece 94.

Figure 5:
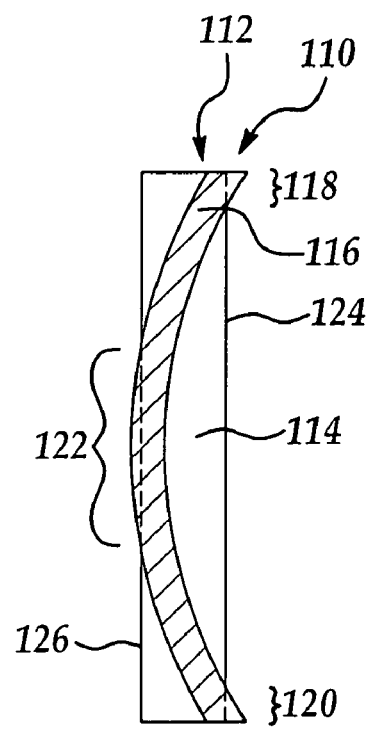
FIG. 5 is an edgewise view of yet another embodiment of the engineered welded blank of the present invention, including negative steps formed on both sides of the engineered welded blank.

Like the embodiment just described, the laser welded blank 110 of FIG. 5 also includes negative steps, however, this embodiment includes negative steps located on both sides of the laser welded blank. Laser welded blank 110 includes an interface 112 formed between thick and thin sheet metal pieces 114, 116, respectively. Segments 118 and 120 are negative steps formed on an inner side surface 124 of the thicker sheet metal piece, while segment 122 is a negative step formed on an outer side surface 126 of the thicker sheet metal piece. In this particular embodiment, negative steps 118, 120 and 122 only partially extend beyond the corresponding side surface of thicker sheet metal piece 114, however, it is possible that one or more of these negative steps could extend completely beyond a side surface of the thicker sheet metal piece, as seen with negative step segment 106.

Figure 6:
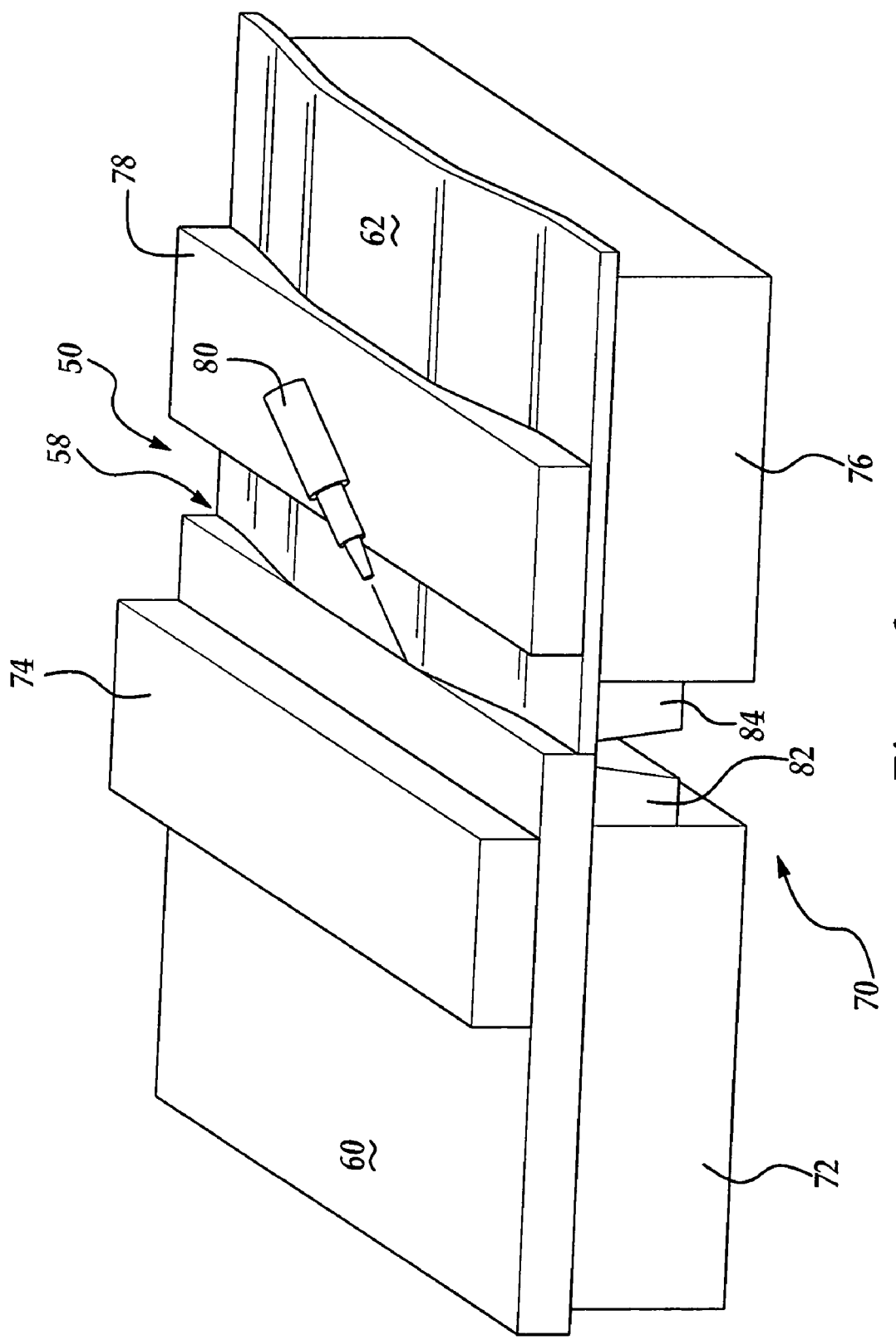
FIG. 6 is a perspective view of an example of an apparatus which may be used to manufacture the engineered welded blank of the present invention.

Turning now to FIG. 6, there is shown an example of a laser welding apparatus 70 which, in this particular instance, is being used to manufacture embodiment 50 of the laser welded blank of the present invention. Laser welding apparatus 70 generally comprises a first nesting component 72 and pressure pad 74, a second nesting component 76 and pressure pad 78, and a laser head 80. The first nesting component 72 is a flat-topped lower support member that is preferably magnetically charged such that it may firmly hold thick sheet metal piece 60 in place. Because the top surface of component 72 is flat, the thick sheet metal piece 60 can be maintained in a flat or planar orientation. An optional ledge component 82 may also be used to provide additional support near the edge-to-edge interface 58. First pressure pad 74 sits atop the thick sheet metal piece 60 such that the sheet metal is firmly trapped, thus preventing unwanted movement during the laser welding process. Similarly, thin sheet metal piece 62 is trapped in place in between the second nesting component 76, which is also preferably magnetically charged, and second pressure pad 78. An optional ledge 84 may be used with the second nesting component as well. Thus, the thin sheet metal piece 62 is not maintained in a planar orientation; rather, its surface is contoured in order to produce the inboard and outboard steps and corresponding flush segments previously described. This apparatus provides for easy and convenient modification of the interface, as different nesting components and pressure pads could be used, and their relative heights, lengths, etc. could be modified to accommodate various laser welded blank embodiments, including that shown in FIG. 2.

During manufacturing, the thick sheet metal piece 60 is placed on top of the first nesting component 72, it is properly positioned, and it is magnetically drawn to the nesting component. Following proper positioning, the first pressure pad 74 is brought down into place to further secure the thick sheet metal piece. A similar process takes place with the thin sheet metal piece 62, but instead the thin piece is trapped in between the curved top of second nesting component 76 and the curved bottom of second pressure pad 78. Once the two pieces of sheet metal are secured between their respective nesting components and pressure pads, they are brought together such that a mating edge of one piece contacts a mating edge of the other, thus establishing the interface 58. This type of edge-to-edge abutment is conventionally referred to as a 'butt-joint'. Following the abutment of the two pieces of sheet metal, laser head 80 directs a laser beam at the interface and creates a weld seam along either the entire length of the interface or along certain portions of the interface. Once the laser welded seam is created, an appropriate amount of time is provided for the seam to cool down and solidify, after which the laser welded blank is ready for subsequent stamping, trimming or other manufacturing processes.

It will thus be apparent that there has been provided in accordance with the present invention an engineered welded blank, more specifically a laser welded blank, and a method of manufacture which achieve the aims and advantages specified herein. It will of course be understood that the foregoing description is of preferred exemplary embodiments of the invention and that the invention is not limited to the specific embodiments shown. For instance, a linearly extending negative step segment could also be used. In that case, the interface extends in a linear fashion and contains a negative step, such as those shown in FIGS. 4 and 5, but the edges of thicker and thinner sheet metal pieces are parallel. Thus, a uniform, parallel negative step segment is formed along all or a portion of the interface. Also, it is possible to provide a laser welded blank having an interface such as those described above, where the two pieces of sheet metal are of equal thickness. Various changes and modifications will become apparent to those skilled in the art and all such variations and modifications are intended to come within the scope of the appended claims.

What is claimed is:

1. An engineered welded blank, comprising:
   a first sheet metal piece having at least one edge, a first side, and a second side separated from said first side by the thickness of said first sheet metal piece,
   a second sheet metal piece having at least one edge that is thicker than said edge of said first sheet metal piece, a first side, and a second side separated from said first side by the thickness of said second sheet metal piece, wherein said first and second sheet metal pieces abut one another along an interface of said edges, and
   a weld seam extending along at least a portion of said interface, wherein said interface includes a first segment where said first sides of said first and second sheet metal pieces are flushly aligned across said interface and a second segment where said second sides of said first and second sheet metal pieces are flushly aligned across said interface.

2. The engineered welded blank of claim 1, wherein said edges of said first and second pieces extend in a non-parallel manner, with respect to one another, between said first and second segments.

3. An engineered welded blank, comprising:
a first sheet metal piece having a first side, a second side and at least one edge,
a second sheet metal piece having a first side, a second side and at least one edge that is thicker than said edge of said first piece, wherein said first and second sheet metal pieces abut one another along an interface of said edges, and
a weld seam extending along at least a portion of said interface, wherein said first sides of said first and second sheet metal pieces are flushly aligned along a first segment of said interface and said second sides of said first and second sheet metal pieces are flushly aligned along a second segment of said interface, and
wherein said interface extends along a generally linear path between said first and second segments.

4. The engineered welded blank of claim 1, wherein said interface extends along a generally non-linear path between said first and second segments.

5. The engineered welded blank of claim 1, wherein said interface further includes at least one additional segment where said first sides of said first and second sheet metal pieces are flushly aligned.

6. The engineered welded blank of claim 1, wherein said interface further includes at least one additional segment where said second sides of said first and second sheet metal pieces are flushly aligned.

7. The engineered welded blank of claim 1, wherein said engineered welded blank is a laser welded blank.

8. A vehicle door panel assembly, comprising:
an outer door panel; and
an inner door panel, comprising:
a first sheet metal piece having a first side, a second side and at least one edge,
a second sheet metal piece having a first side, a second side and at least one edge that is thicker than said edge of said first piece, wherein said first and second sheet metal pieces abut one another along an interface of said edges, and
a weld seam extending along at least a portion of said interface, wherein said first sides of said first and second sheet metal pieces are flushly aligned along a first segment of said interface and said second sides of said first and second sheet metal pieces are flushly aligned along a second segment of said interface.

9. An engineered welded blank, comprising:
a first sheet metal piece having a first edge, an outer side, and an inner side separated from said outer side by the thickness of said first sheet metal piece,
a second sheet metal piece having a second edge, an outer side, and an inner side separated from said outer side by the thickness of said second sheet metal piece, wherein said first and second edges have unequal thicknesses and abut one another along an edge-to-edge interface, and
a weld seam extending along at least a portion of said interface, wherein said interface includes a first segment that is stepped between said outer sides of said first and second sheet metal pieces, and a second segment that is flush between said outer sides of said first and second sheet metal pieces.

10. The engineered welded blank of claim 9, wherein said first and second edges extend in a non-parallel manner, with respect to one another, between said first and second segments.

11. An engineered welded blank, comprising:
a first sheet metal piece having an outer side, an inner side and a first edge,
a second sheet metal piece having an outer side, an inner side and a second edge, wherein said first and second edges have unequal thicknesses and abut one another along an edge-to-edge interface, and
a weld seam extending along at least a portion of said interface, wherein a first segment of said interface is stepped between said inner sides of said first and second sheet metal pieces and a second segment of said interface is stepped between said outer sides of said first and second sheet metal pieces,
wherein said interface extends along a generally linear path between said first and second segments.

12. The engineered welded blank of claim 9, wherein said interface extends along a generally non-linear path between said first and second segments.

13. The engineered welded blank of claim 9, wherein said edge-to-edge interface further includes at least one additional segment that is stepped between said inner sides of said first and second sheet metal pieces.

14. The engineered welded blank of claim 9, wherein said edge-to-edge interface further includes at least one additional segment that is stepped between said outer sides of said first and second sheet metal pieces.

15. An engineered welded blank, comprising:
a first sheet metal piece having an outer side, an inner side and a first edge,
a second sheet metal piece having an outer side, an inner side and a second edge, wherein said first and second edges have unequal thicknesses and abut one another along an edge-to-edge interface, and
a weld seam extending along at least a portion of said interface, wherein a first segment of said interface is stepped between said inner sides of said first and second sheet metal pieces and a second segment of said interface is stepped between said outer sides of said first and second sheet metal pieces,
wherein at least one of said first and second segments is located at least partially beyond either said inner side or said outer side of said second sheet metal piece, thereby forming a negative step.

16. An engineered welded blank, comprising:
a first sheet metal piece having an outer side, an inner side and a first edge,
a second sheet metal piece having an outer side, an inner side and a second edge, wherein said first and second edges have unequal thicknesses and abut one another along an edge-to-edge interface, and
a weld seam extending along at least a portion of said interface, wherein a first segment of said interface is stepped between said inner sides of said first and second sheet metal pieces and a second segment of said interface is stepped between said outer sides of said first and second sheet metal pieces,
wherein said first segment is a negative step located at least partially beyond said inner side of said second sheet metal piece and said second segment is a negative step located at least partially beyond said outer side of said second sheet metal piece.

17. The engineered welded blank of claim 9, wherein said engineered welded blank is a laser welded blank.

18. A vehicle door panel assembly, comprising:
an outer door panel; and
an inner door panel, comprising:
   a first sheet metal piece having an outer side, an inner side and a first edge,
   a second sheet metal piece having an outer side, an inner side and a second edge, wherein said first and second edges have unequal thicknesses and abut one another along an edge-to-edge interface, and
   a weld seam extending along at least a portion of said interface, wherein said interface includes a first segment that is stepped between said outer sides of said first and second sheet metal pieces, and a second segment that is flush between said outer sides of said first and second sheet metal pieces.

19. A door panel assembly for use on a vehicle, comprising:
an inner door panel including:
   a thick sheet metal piece for reinforcing a portion of the inner door panel, said thick piece having an outer side, an inner side and an edge,
   a thin sheet metal piece having an outer side, an inner side and an edge that is thinner than said edge of said thick piece, wherein said thick and thin sheet metal pieces abut one another along an interface of said edges, said interface includes a first segment where said inner sides of said thick and thin pieces are flush with each other and a second segment where said outer sides of said thick and thin pieces are flush with each other, and;
   a laser welded seam extending along at least a portion of said interface;

an outer door panel, and;

a seal extending along at least a portion of the periphery of said door panel assembly;

wherein said seal extends across said interface at said first segment and said outer door panel contacts said interface at said second segment.

\* \* \* \* \*